United States Patent [19]
Schiesterl et al.

[11] 3,810,653
[45] May 14, 1974

[54] MOTOR VEHICLES EQUIPPED WITH GAS CUSHION

[75] Inventors: Gerhard Schiesterl, Stuttgart; Helmut Wulf, Nellingen, both of Germany

[73] Assignee: Daimler-Benz Aktiengesellschaft, Stuttgart-Unterturkheim, Germany

[22] Filed: May 21, 1971

[21] Appl. No.: 145,639

[30] Foreign Application Priority Data
May 21, 1970 Germany .......................... 2024813

[52] U.S. Cl. .......................................... 280/150 AB
[51] Int. Cl. .............................................. B60r 21/10
[58] Field of Search ...... 137/527, 537; 180/250 AB; 181/36 D, 36 R, 42, 50; 206/46 FC; 244/122; 251/303, 299

[56] References Cited
UNITED STATES PATENTS
| | | | |
|---|---|---|---|
| 2,224,494 | 12/1940 | White | 137/527 |
| 2,297,892 | 10/1942 | Jacobs | 137/535 X |
| 3,159,176 | 12/1964 | Russell et al. | 137/525.1 X |
| 3,195,530 | 7/1965 | Heidner | 181/50 X |
| 3,197,234 | 7/1965 | Bertrand | 280/150 AB |
| 3,455,410 | 7/1969 | Wilson | 180/102 X |
| 3,632,135 | 1/1972 | Chute et al. | 280/150 AB |
| 3,642,303 | 2/1972 | Irish et al. | 280/150 AB |

FOREIGN PATENTS OR APPLICATIONS
| | | | |
|---|---|---|---|
| 1,077,085 | 10/1957 | Germany | 181/36 |
| 1,280,072 | 8/1966 | Germany | 280/150 AB |

Primary Examiner—David Schonberg
Assistant Examiner—Terrance L. Siemens
Attorney, Agent, or Firm—Craig and Antonelli

[57] ABSTRACT

A motor vehicle equipped with gas cushions arranged on the inside of the vehicle which are adapted to be inflated for the protection of the vehicle passengers in case of a collision by means of a gas stored in tanks and released by the ignition of blast cartridges initiated by deceleration measuring devices whereby the containers and blast cartridges are arranged outside of the vehicle passenger space itself, for example, in the engine space, and/or in the luggage space.

24 Claims, 3 Drawing Figures

PATENTED MAY 14 1974

INVENTORS
GERHARD SCHIESTERL
HELMUT WULF

BY Craig, Antonelli & Hill

ATTORNEYS

MOTOR VEHICLES EQUIPPED WITH GAS CUSHION

The present invention relates to a motor vehicle with gas cushions arranged therein, which for the production of the vehicle passengers in case of a collision are adapted to be inflated by a gas which is released from containers by ignition or blasting cartridges triggered by deceleration measuring devices.

Gas cushions have the task to protect the vehicle passengers in case of a strong deceleration, which occurs during an accident, against a contact with the fixed rigid parts disposed in front of the passengers within the vehicle, in that the gas cushions between the vehicle passengers and the vehicle parts disposed in front thereof are temporarily inflated.

A gas cushion system consists of a container or tank with solid, liquid or gaseous content which is equipped with a relatively weak diaphragm. A blasting cartridge is secured at this diaphragm or in the container. A cover is mounted over the diaphragm of the container which is constructed as sieve. The gas cushion, properly speaking, is arranged outside of the sieve zone. Electric lines lead from the blasting cartridge to the ignition pulse transmitter which as a rule is constructed as a deceleration measuring device. If now by reason of a strong deceleration (accident) the ignition pulse transmitter closes the energizing circuit, the blasting cartridge is ignited. As a result thereof, the diaphragm of the container or tank is destroyed either directly or indirectly and the gas released thereby can escape under high pressure through the sieve cover into the gas cushion. The sieve has the function to retain the parts of the splintered, fragmented diaphragm. The filling of the gas cushion, however, can also take place by burning of a pure powder charge.

It has now been discovered that this system which otherwise has numerous advantages, also faces some grave disadvantages, and more particularly the disadvantages of sound and pressure development. After the ignition of a blasting cartridge with a closed vehicle passenger space a sudden bang occurs of the order of magnitude of 170 decibels and an excess pressure of about 0.08 at.

The present invention is concerned with the task to avoid such strong sound and pressure developments which can affect the vehicle passengers in an extraordinarily annoying manner.

The underlying problems are solved according to the present invention in that the containers and blasting cartridges are arranged outside of the space for the vehicle passengers, for example, in the engine space and/or in the luggage space.

A lower noise development results from the measures taken according to the present invention and the eventual production of splinters which stem from the blasting cartridge or from the diaphragm, has no affect on the passengers.

In an advantageous construction of the present invention, the tanks or containers may be connected with the gas cushions by way of hoses, however, for the same purpose, structural parts already present anyhow in the motor vehicle, for example, the outer column surrounding the steering spindle may be utilized if a gas cushion is arranged in the steering wheel hub.

The containers and blasting cartridges, possibly also the hoses and the structural parts serving as such may be provided with a sound insulation in order that the produced noises are still further attenuated.

If, according to a further feature of the present invention, a common container, possibly equipped with two blasting cartridges for safety reasons, is provided for several or all of the gas cushions, the noise development is further reduced because blasting cartridges with smaller output can be utilized.

Each container may form a structural unit together with its blasting cartridge and acceleration measuring device. Furthermore, a contact connected in series with the blasting cartridge may be arranged in each vehicle seat which contact is closed when the seat is coupled. In this manner, only the gas cushions are inflated which are necessary. Both the bang as also the excess pressure are reduced thereby.

According to a further feature of the inventive subject matter, the space for the vehicle passengers may be provided with valves or the like opening toward the outside or into other spaces, for example, sealing lips, in order that the excess pressure produced by the gas cushions is rapidly decreased.

It is, of course, possible in an analogous manner to utilize gas cushion systems according to the present invention also in other types of vehicles, for example, in air crafts. Furtheremore, it is possible not only to protect passengers but also animals, for example, horses in transport vehicles, and goods.

Accordingly, it is an object of the present invention to provide a motor vehicle equipped with a gas cushion protective system which avoids by simple means the aforementioned shortcomings and drawbacks encountered in the prior art.

Another object of the present invention resides in a gas cushion system for protecting the passengers of motor vehicles which is so constructed and arranged as to decrease the noise and pressure development attendant to the inflation of the gas cushions.

A further object of the present invention resides in a motor vehicle equipped with a protective gas cushion system which is simple in construction, reliable in operation, and minimizes the annoyance to vehicle passengers as a result of the noise and pressure increase caused by the detonation and inflation of the gas cushions.

A still futher object of the present invention resides in a motor vehicle equipped with gas cushions which insures that only those gas cushions actually needed for the protection of the passengers present in the vehicle are inflated.

These and further objects, features and advantages of the present invention will become more obvious from the following description when taken in connection with the accompanying drawing which shows, for purposes of illustration only, one embodiment in accordance with the present invention, and wherein.

Figure 1:
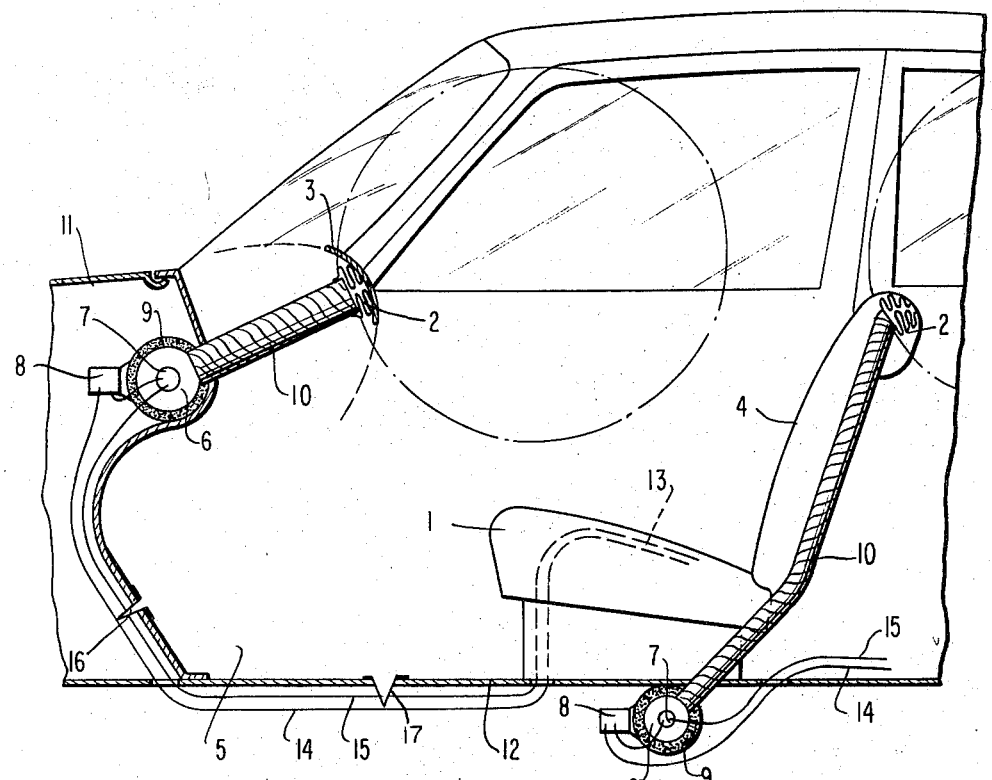
FIG. 1 is a schematic longitudinal cross-sectional view through the forward section of the interior space of a motor vehicle equipped with a gas cushion system according to the present invention.

Referring now to FIG. 1, for the passengers of the illustrated motor vehicle, gas cushions are provided for protection against the consequences of collisions or similar accidents which are inflated in the presence of strong decelerations. For the driver of the vehicle, a gas cushion folded together is disposed in the steering wheel hub and for a person seated behind the driver, a gas cushion is provided in the backrest of the driver seat. For a person seated alongside the driver on the seat 1, a gas cushion 2 in the folded-together condition is located in the instrument board 3 whereas a gas cushion 2 is stored in the backrest 4 of the seat 1 for a person seated in the rear seat.

In order to keep from the interior space 5 of the motor vehicle, the strong sound and pressure development which occurs when the gas cushions are inflated, the containers or tanks 6 together with blast cartridges 7 and sensors 8 of any conventional construction appertaining to the gas cushions are arranged outside the interior space 5 and the containers or tanks 6 which are provided with a sound insulation 9, are connected with the gas cushions by way of hoses 10 with relatively large diameter. The container 6 for one gas cushion 2 is located in the engine space 11, while the container 6 for the other gas cushion 2 is accommodated underneath the vehicle floor 12.

In order that no gas cushion is inflated unnecessarily, a switch 13 is associated with each gas cushion which is arranged in the corresponding seat 1. Electric lines 14, 15 lead from the switch 13 to the sensor 8 and to the blasting cartridge 7. In case of an unoccupied seat, the electric connection between the sensor 8 and the blasting cartridge 7 is interrupted by the switch 13. An inflating of the corresponding gas cushion cannot take place.

During the inflation of the gas cushions 2, an excess pressure is produced in the interior space 5 of the motor vehicle. This excess pressure is rapidly reduced by a valve consisting of sealing lips 16 which opens in the direction toward the engine space 11. Valves of similar type may also be provided which open into the luggage space or into the atmosphere, such as valve 17 in FIG. 1.

Figure 2:
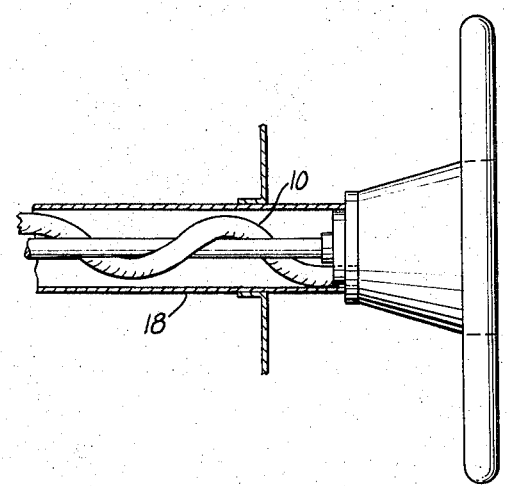
FIG. 2 is a schematic cross-sectional view of a steering wheel with a steering column which serves as a line for gas.

The container with blasting cartridge and sensor for the gas cushion arranged in the steering wheel hub for the protection of the driver may be arranged advantageously in the engine space 11 and the outer steering column 18, as shown in FIG. 2, may serve as line for the gas escaping out of the tank.

Possibly only one single sensor may be provided for the gas cushion in the steering wheel hub and for the gas cushion in the instrument panel.

Figure 3:
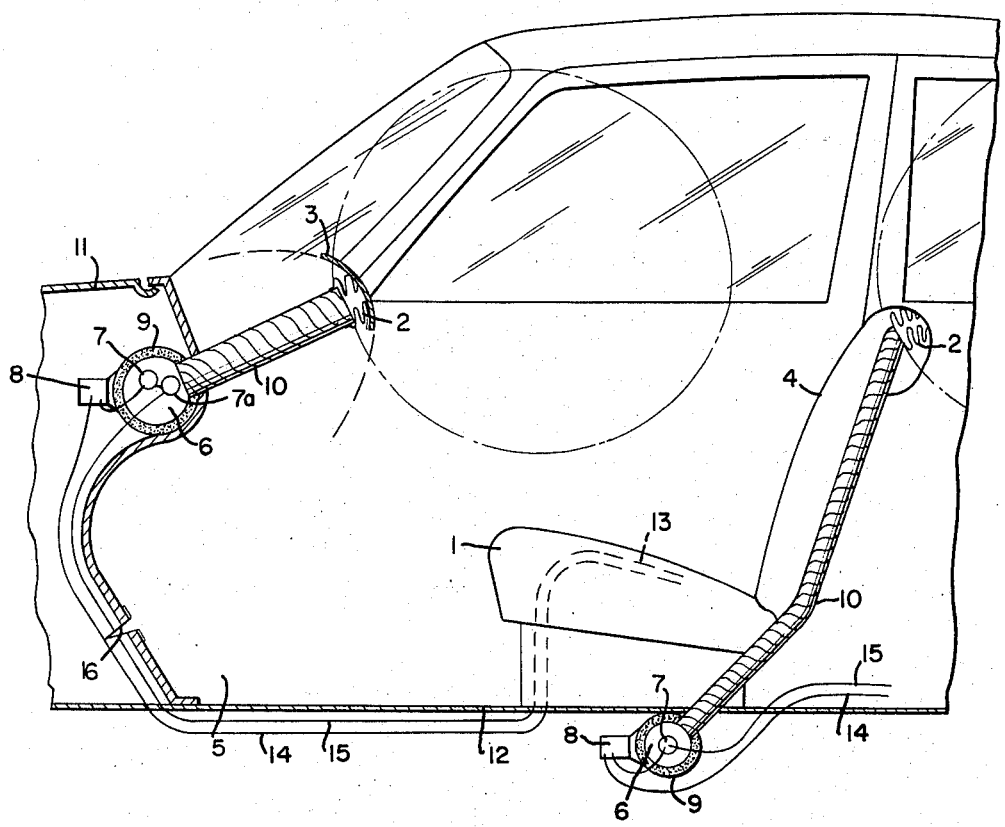
FIG. 3 is a schematic cross-sectional view of a further embodiment according to the present invention.

A further embodiment of the present invention is indicated in FIG. 3, wherein two blasting cartridges 7 and 7a are included with the container 6. This arrangement further reduces noise development, since smaller output cartridges can be utilized.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A gas cushion safety device for use in motor vehicles comprising a plurality of gas cushion means for protecting vehicle passengers during collision, said plurality being arranged in an uninflated condition with one gas cushion means disposed in front of each vehicle passenger seat, and being inflatable; at least one container means disposed outside said passenger compartment for containing gas to inflate at least one of said gas cushion means; at least one blasting cartridge means, operatively connected to and disposed together with said container means, for causing gas to be released from said container means, such that at least one gas cushion means is inflated, each of said container means and cartridge means being provided with sound insulation; deceleration measuring means for controlling said blasting cartridge means upon collisions; means for conducting released gas within existing structural parts of said vehicle from said container means to at least one said gas cushion means; contact means disposed in each vehicle passenger seat for controlling the gas cushion means disposed there in front when said seat is occupied during collisions; and valve means opening out of said passenger compartment for reducing pressure within said passenger compartment when said gas cushion means is inflated.

2. A safety device according to claim 1, wherein at least one container means and cartridge means are arranged in one of the engine compartment and the luggage compartment.

3. A safety device according to claim 1, wherein said means for conducting are hoses.

4. A safety device according to claim 1, wherein one of said existing structural parts is an outer column for a steering spindle.

5. A safety device according to claim 1, wherein said means for conducting is provided with sound insulation.

6. A safety device according to claim 1, wherein one container means is provided for several gas cushion means.

7. A safety device according to claim 6, wherein said one container means is provided for all of the gas cushion means.

8. A safety device according to claim 6, wherein said one container means is disposed with two blasting cartridge means.

9. A safety device according to claim 6, wherein each container means, cartridge means and deceleration measuring means together form a structural unit.

10. A safety device according to claim 6, wherein said contact means is series-connected with a respective cartridge means, which contact means is closed when the vehicle passenger seat is occupied.

11. A safety device according to claim 1, wherein said valve means are constituted by sealing lips.

12. A safety device according to claim 11, wherein said valve means open toward the atmosphere on the outside of the vehicle.

13. A safety device according to claim 11, wherein said valve means open into other compartments of the vehicle.

14. A safety device according to claim 1, wherein each container means, cartridge means and deceleration measuring means together form a structural unit.

15. A gas cushion safety device for use in motor vehicles comprising a plurality of gas cushion means for protecting vehicle passengers during collisions, said plurality being arranged in an uninflated condition in the passenger compartment of said vehicle with one gas cushion means disposed in front of each vehicle passenger seat, and being inflatable upon collisions; means for inflating said plurality of gas cushion means upon collisions, said means for inflating including at least one container means for providing gas to inflate at least one of said gas cushion means, and at least one blasting cartridge means operatively connected to said container means for causing the release of gas from said container means, each of said container means and cartridge means being provided with sound insulation; and switch means disposed in each vehicle passenger seat for controlling the means for inflating, such that only gas cushion means disposed in front of occupied passenger seats are inflated upon collision.

16. A safety device according to claim 15, further including sensor means, operatively connected to said means for inflating and said switch means, for activating said means for inflating upon sensing collisions.

17. A safety device according to claim 15, wherein said switch means is connected in series with said means for inflating.

18. A safety device according to claim 15, wherein said switch means is connected in series between said at least one blasting cartridge means and said sensor means, such that when a respective vehicle passenger seat is unoccupied, the corresponding gas cushion means remains uninflated.

19. A safety device according to claim 15, further comprising valve means opening out of said passenger compartment for reducing pressure within said passenger compartment when said gas cushion means is inflated.

20. A safety device according to claim 15, wherein said container means is disposed outside the passenger compartment.

21. A safety device according to claim 20, wherein said blasting cartridge means is disposed together with said container means.

22. A safety device according to claim 15, wherein said gas cushion means is connected with said container means by a means for conducting.

23. A safety device according to claim 22, wherein said means for conducting includes existing structural parts of said vehicle.

24. A safety device according to claim 23, wherein said existing structural parts include an outer column for a steering spindle.

* * * * *